J. H. BAKER & D. ANDERSON.
APPARATUS FOR TAPPING COUPLINGS.
APPLICATION FILED FEB. 25, 1909.
947,727.
Patented Jan. 25, 1910.
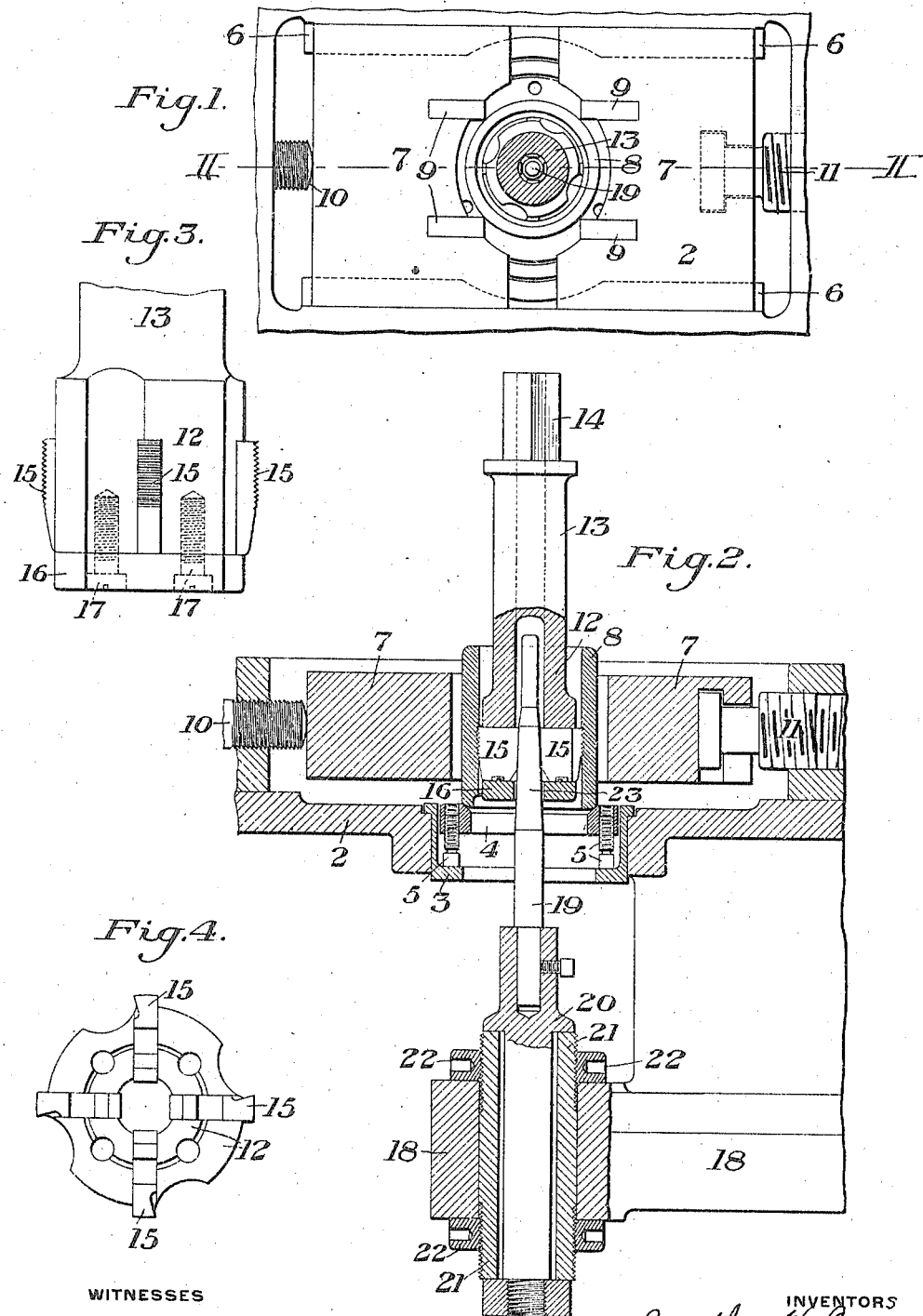

UNITED STATES PATENT OFFICE.

JONATHAN H. BAKER AND DAVID ANDERSON, OF McKEESPORT, PENNSYLVANIA, ASSIGNORS TO NATIONAL TUBE COMPANY, OF PITTSBURG, PENNSYLVANIA, A CORPORATION OF NEW JERSEY.

APPARATUS FOR TAPPING COUPLINGS.

947,727.     Specification of Letters Patent.     Patented Jan. 25, 1910.

Application filed February 25, 1909. Serial No. 479,967.

*To all whom it may concern:*

Be it known that we, JONATHAN H. BAKER and DAVID ANDERSON, both of McKeesport, Allegheny county, Pennsylvania, have invented a new and useful Apparatus for Tapping Couplings, of which the following is a full, clear, and exact description, reference being had to the accompanying drawings, forming part of this specification, in which—

Figure 1 is a plan view partly in section showing improved apparatus constructed and arranged in accordance with our invention; Fig. 2 is a sectional side elevation taken on the line II—II of Fig. 1 showing the parts as arranged during the tapping operation: Fig. 3 is a partial side elevation and Fig. 4 is an end elevation of the coupling tap with the pilot removed, showing the manner in which the radially movable cutters are secured in place.

Our invention relates to the class of cutting tools employed in cutting internal threads in pipe couplings, sockets and other pipe fittings, and also used for tapering straight threads which have been cut in the coupling or other fitting by a previous operation.

The object of our invention is to provide an improved apparatus for cutting and tapering the threads on such couplings by the use of which the successive threads are made uniform in size and which are cut to the correct angle and taper.

Another object of the invention is to provide improved apparatus in the use of which the threads are cut on the couplings outwardly, from a point intermediate of the length of the couplings and by which opposite ends of the couplings can be tapped with right and left hand threads.

A further object of our invention is to provide improved means for adjusting the tap and mandrel relatively to each other to the couplings.

Another object of the invention is to provide apparatus in which the cutters on the taps are moved out of engagement with the couplings when the threading operation has been completed, in this way avoiding the necessity of backing out or unscrewing the tap from the threaded coupling.

Heretofore in the use of apparatus of this class, difficulty has been found in cutting threads which are free from inequalities and in preventing the angle of the successive threads from varying. By the use of our improved apparatus, these difficulties are overcome, the threads are cut straight and true on the couplings and the quality of the finished couplings is greatly improved.

In the drawings 2 represents the table of a vertical tapping machine which is shown as one of a plurality of such tables formed integral to provide a multiple spindle tapping machine. The table 2 is provided with a basket 3 having an adjusting ring 4 therein, the ring 4 being adjusted vertically by means of the adjusting screws 5. Sliding on suitable ways or guides 6 are the clamping jaws by which the couplings 8 are held in position while being tapped. The jaws 7 are each provided with hardened steel inserts 9 which are removably secured in place and which engage with the coupling 8 to hold it in place while being tapped. A clamp adjusting screw 10 is provided which, together with the clamping screw 11 is employed to adjust the jaws 7 in centering and holding the couplings 8 in place below the spindles of the machine.

The tap 12 is provided with a hollow or tubular shank 13 preferably having a suitable squared portion 14 which engages with the socket in the end of the rotating spindle on the tapping machine. The tap 12 is provided with a plurality of radially movable chasers or cutters 15, these cutters being held in place by means of the tap pilot 16 which is secured to the end of the tap 12 by means of the cap screws 17.

Beneath the table 2 is an arm 18 in which the mandrel or pilot pin 19 is adjustably secured. The pilot pin or mandrel 19 is removably secured in the socket 20 which in turn is secured in a screw threaded sleeve 21 which is inserted in an opening in the arm 18. The sleeve 21 is provided with adjusting nuts 22 by which the sleeve with the mandrel socket and mandrel are adjusted vertically on the arm 18.

In the operation of tapping couplings with our improved apparatus, the adjusting ring 4 in the basket 3 and the mandrel 19 mounted on the arm 18 are adjusted relatively to each other so as to bring the tapered portion 23 of the mandrel into position to properly engage with the radially movable cutters 15 on the tap. The tap 12 is put in place on the spindles of the tapping machine and the coupling 8 is put on the adjusting ring 4. The jaws 7 are then advanced until the plates 9 grip and hold the coupling from rotation. The spindle is then caused to rotate and the tap 12 is advanced into the coupling. When the cutters 15 are advanced into the coupling to about half the length of the coupling, the tapered portion 23 of the mandrel 19 will have advanced the cutters 15 into cutting engagement with the couplings. As the tap 12 is further advanced the cutters are gradually moved radially outward so as to cut an outwardly tapering thread which extends from about the middle of the length of the coupling to its outer edge. This completes the cutting operation for one half of the coupling and when this operation is finished the cutters 15 are clear of the coupling and do not require being backed out of the coupling as is the usual case. The gripping jaws 7 are then retracted and the released coupling is reversed in its position on the adjusting ring 4, the clamping jaws are again tightened and the above described operation is again repeated and the second half of the length of the coupling is threaded.

In some cases it is desirable to cut right and left hand threads on the coupling, in which case one end of the coupling will be tapped with a right or left hand tap and the coupling then finished by cutting threads of the other hand to that first cut.

With some couplings the threads are first cut straight throughout the length of the coupling in a preliminary operation and the straight threads on the coupling are afterward tapered in a second operation in which our improved tap is used which will taper the threads in the same manner as that described for cutting the threads.

The advantages of our invention will be apparent to those skilled in the art. By means of our improved apparatus couplings of different lengths and sizes may be tapped by adjusting the mandrel 19 to the required position so as to engage with the radially movable cutters at the proper point. The couplings are tapped from the center of their length outwardly and a tapering thread is cut. The cutters do not rock during the cutting operation and a true thread having the same angle of thread throughout is obtained.

Modifications in the construction and arrangement of the parts may be made without departing from our invention. Instead of applying our invention to a vertical tapping machine as shown, the apparatus may be horizontal. The number of taps may be varied as is desired; the number of the radially movable cutters on the taps may be changed, and other variations may be made in the construction of the apparatus without departing from our invention.

We claim:

Apparatus for tapping couplings comprising a tap having a radially movable cutter, means for holding the couplings while being tapped and a mandrel secured to said coupling-holding means for controlling the radial movement of the cutter in the coupling, said mandrel being arranged to hold the axis of rotation of the cutter concentric with the axis of the coupling and having means permitting the insertion of the tap into the coupling without engaging with the coupling; substantially as described.

In testimony whereof, we have hereunto set our hands.

JONATHAN H. BAKER.
DAVID ANDERSON.

Witnesses:
Jas. P. Davis,
Jos. T. Armstrong.